United States Patent [19]
Hosoe et al.

[11] 3,856,399
[45] Dec. 24, 1974

[54] AUTOMATICALLY ADJUSTABLE FOCUSING SYSTEM

[75] Inventors: Kazuya Hosoe; Seiichi Matsumoto, both of Tokyo, Japan

[73] Assignee: Canon Kabushiki Kaisha, Tokyo, Japan

[22] Filed: Mar. 14, 1973

[21] Appl. No.: 341,056

[30] Foreign Application Priority Data
Mar. 22, 1972 Japan.............................. 47-28772

[52] U.S. Cl............................. 356/1, 356/4, 356/5, 356/141, 95/44 C
[51] Int. Cl............................................. G01c 3/08
[58] Field of Search ......... 356/1, 4, 5, 141; 95/44 C

[56] References Cited
UNITED STATES PATENTS

| | | | |
|---|---|---|---|
| 3,016,464 | 1/1962 | Bailey | 356/1 |
| 3,435,744 | 4/1969 | Stimson | 356/1 |
| 3,553,455 | 1/1971 | Sato et al. | 250/201 |
| 3,554,646 | 1/1971 | Carlson | 356/4 |
| 3,610,754 | 10/1971 | Pirlet | 356/1 |

*Primary Examiner*—Maynard R. Wilbur
*Assistant Examiner*—S. C. Buczinski
*Attorney, Agent, or Firm*—Fitzpatrick, Cella, Harper & Scinto

[57] ABSTRACT

This invention is concerned with an automatically adjustable focusing system wherein a radiating source for making a range mark on an object and a light receiving means adapted to form an image by receiving a radiant ray reflected from the object from the radiant rays of said radiating source, are arranged in a spaced relation with respect to each other so that both optical axes are parallel, and at least a part of said light receiving means or a separate member functions to intermittently project a flux of the rays reflected from the object onto a photoelectric conversion element, whereby an output signal of said photoelectric conversion element is compared with another reference signal to detect a range of the object.

14 Claims, 7 Drawing Figures

(a)
(b)

AUTOMATICALLY ADJUSTABLE FOCUSING SYSTEM

BACKGROUND OF THE INVENTION

1. Field of the Invention

The invention is directed to the field of automatically adjustable focusing systems which employ the principle of a range finding in a base line type of range finder.

2. Description of the Prior Art

Various prior art automatically adjustable focusing systems based on the principle of a range finding in a base line type range finder have been proposed by U.S. Pat. Nos. 3,367,254 and 3,529,528.

The former patent concerns a method for detecting a movement of an image for a mark on the object formed by the light receiving system with a variation of the range of the object using two mirrors, one mirror being fixed to enter an incident ray from the object into the photoelectric conversion element at a constant angle while the other mirror is adapted to enter an incident ray into said photoelectric conversion element at all times irrespective of the variation of the range relative to the object, while being changed in cooperation with the movement with the variation of the range of the object, and the displacement of the incident ray which entered through the respective mirrors, is made as a difference of the incident intensity and, therefore, this is not always an advantageous method in respect of the accuracy of the distance and the ratio of the signal to the noise.

The latter patent concerns a method for spatially detecting a movement of an image for a mark on the object formed by the light receiving system with variation of the range of the object. According to this method, in order to detect the variation of the range of the object, it is necessary to arrange at least two photoelectric conversion elements in the moving direction of the image and a normally extremely feeble radiant ray, which enter the light receiving system, is detected, and further variation of the image is detected as a difference of the incident intensity into more than two photoelectric conversion elements and, therefore, this is not always an advantageous method in respect of the accuracy of the distance and the ratio of the signal to the noise.

SUMMARY OF THE INVENTION

It is, therefore, an object of this invention to remove the disadvantages noted above with respect to the piror art devices and to provide a highly precise automatically adjustable focusing system.

It is a further object of this invention to provide a more effective and accurate automatically adjustable focusing system by realizing the ratio of the high signal to the noise.

It is another object of this invention to provide an automatically adjustable focusing system for detecting a movement of the image as a variation of the time delay in that the flux of radiant rays reflected from the object is projected on the photoelectric conversion element with respect to a reference signal.

According to the automatically adjustable focusing system of the invention, a radiant ray output of the light source is made constant and the incidence of the radiant ray into the photoelectric conversion element is converted into a so-called digital signal to obtain a ratio of the high signal to the noise, thus facilitating a signal treatment and a highly accurate range finding, and in addition, the range may be found by detecting the existence of the incidence of the flux of reflected rays into the phtoelectric conversion element.

DESCRIPTION OF THE PREFERRED EMBODIMENTS

Figure 1:
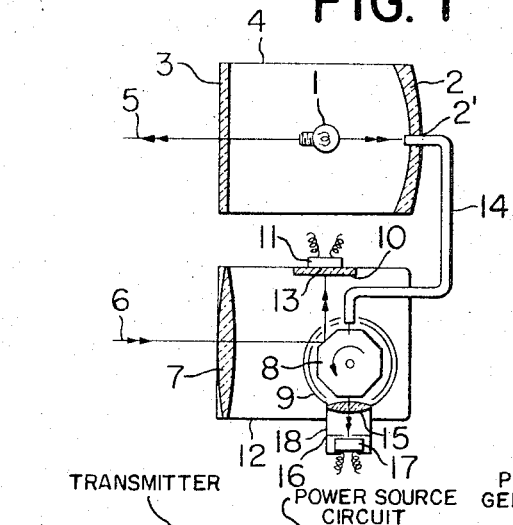
FIG. 1 is a view showing one embodiment according to this invention.

In FIG. 1, there is shown a source of radiant ray 1 for making a mark on the object, said source comprising a solid light producing element such as a tungsten lamp, Xe lamp or a light producing diode, etc. Since the source of radiant ray 1 is set in a focal point of a mirror 2, the radiant ray radiated from the source 1 is reflected by a spherical mirror and is projected in the form of a parallel flux of radiant rays through a filter 3 for making the radiant rays disposed frontwardly thereof into a wave length region as desired. A mirror cylinder for supporting the aforesaid elements is designated at 4. The source of radiant ray 1, spherical mirror 2, filter 3, and mirror cylinder 4 are hereinafter collectively called a transmitter.

A light receiving system is arranged in a constant spaced relation of base line with an optical axis 5 of said transmitter. The light receiving system is placed on an optical axis 6 and the flux of radiant rays reflected by the object is caught by an optical system 7 and is reflected substantially in a direction at right angles by a rotating prism 8 that is connected with a motor 9 and rotates at constant speed, and the flux of radiant rays is intermittently projected for example, leftwards as viewed in the drawing, by the rotation of the prism, through a filter 10 having a characteristic similar to that of the swing filter 3, and a slit 13 made in part of a mirror cylinder 12, to a photoelectric conversion element 11. On the other hand, in order to produce a range finding reference signal, a radiant ray from the radiant source 1 is introduced by a light guide 14 having one end inserted into a small port 2' made in the central portion of the spherical mirror 2 and having the other end positioned opposite the rotating prism 8.

The radiant ray penetrates the prism 8 and enters a reference signal producing photoelectric element 17 through an optical system 15 disposed within a mirror cylinder 18 and a slit 16.

The operation of the apparatus, having been constructed as above, is as follows:

The radiant ray radiated from the radiant source 1 is amplitude-modulated by a pulse generator or the like at a constant frequency, for example, 20 Hz or so, in order to discriminate from radiant rays existing outside. After formed a substantially parallel flux of radiant rays, only the portion having a wave length region as desired is projected on the object through the filter 3. The reflected flux of radiant rays reflected by the object enters the optical system 7 of the light receiver in a constant spaced relation of base line with the transmitter at an angle corresponding to the range of the object.

Figure 6:
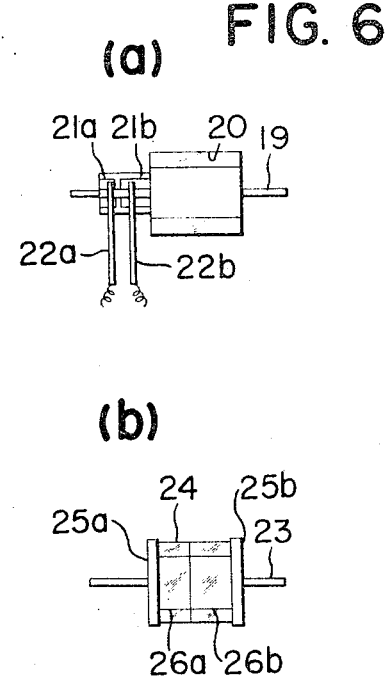
FIG. 6 shows views illustrating modes of a polygonal prism for intermittently radiating the flux of reflected rays by the object into the photoelectric conversion element, according to this invention.

The rotating prism 8 is suitabley positioned in such a manner that the flux of radiant rays entering through the optical system 7 is reflected by one surface of the prism so as to be projected on the photoelectric conversion element 11. At the moment when one surface of the prism has an angle of 45° to the optical axis 6, the flux of radiant rays from the object precisely passes through the slit 13 and enters the photoeelectric conversion element 11. At this time, the flux of radiant rays passed through the light guide 14 penetrates through two parallel surfaces of the prism 8 and enters the reference signal producing photoelectric conversion element 17. That is, a reference signal is produced as an output of the photoelectric conversion element 17 only at the moment when one surface of the rotating prism 8 has an angle of 45° to the optical axis 6. When the object is within the limited range, the reflected flux of radiant rays enters the optical system 7 with an inclination according to the range thereof so that the flux of radiant rays is projected on the photoelectric conversion element, after being reflected by the prism, at the moment when one surface of a prism is displaced from the position at 45° to the optical axis 6 by a minute angle corresponding to said inclination and, therefore, the time difference between the generation of the output from the photoelectric conversion element 11 and the generation of its reference signal varies with the range of the object. If the relation between the range of the object and the time difference relative to the generation of the two signals is predetermined, it becomes is possible to find the range of or the distance to the object by way of the time difference for the generation of the two signals. Further, the rotating prism as shown in this embodiment may be constructed, for example, as shown in FIG. 6, and in FIG. 6 (*a*) a reference signal is not optically is generated but generated by way of the electrical contact of contacts. In FIG. 6 (*a*) a shaft 19 supports a multiface reflection prism 20. Numeral 21 denotes a contact which generates a reference signal by rotation of the prism 20. Contact 21*a* is always kept in contact with contact 22*a* while 21*b* is a contact piece extended to position corresponding to the respective surface of the prism 20. Contact 22*b* and each surface of the prism are brought in contact only at the moment when they are brought into a constant angular position and, therefore, if a suitable voltage is applied between contacts 22*a* and 22*b*, a reference signal is generated pulsewise when the prism 20 occupies a particular position. FIG. 6 (*b*) shows a mode applicable to the embodiment shown in FIG. 1. Numeral 23 denotes a shaft which supports a rotating multiface prism 24 having both of its ends held by holders 25*a* and 25*b*. The prism 24 is divided into two portions, that is, one portion having its surface made transparent as in 26*a* and the other portion being applied with a reflection film as in 26*b*, and it is contemplated that a flux of radiant rays for reference signal penetrates the portion 26*a* and the reflected flux of radiant rays from the object is reflected at the portion 26*b*.

Figure 2:
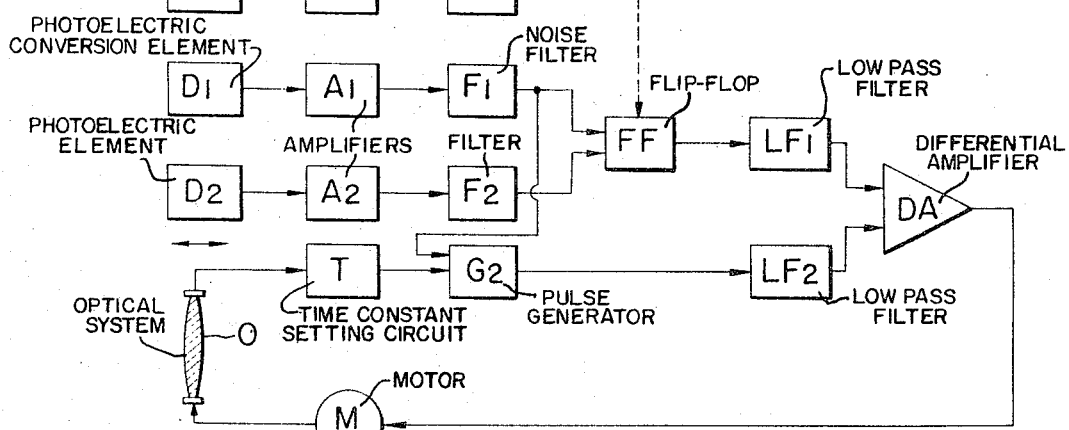
FIG. 2 is a block diagram showing a signal treatment in the embodiment shown in FIG. 1.

FIG. 2 is a block diagram for an electric circuit suitable for a range detecting device. A pulse of constant frequency is generated by a pulse generator $G_1$, and a radiant ray is radiated from a transmitter through a source circuit S. Reflected flux of radiant rays from the object is detected by a photoelectric conversion element $D_1$ to obtain only an extremely feeble output and therefore it is amplified by an amplifier $A_1$ and enters a noise filter $F_1$ which removes various noises. An output of the noise filter $F_1$ is formed into a pulse almost in coincidence with the variation of the radiant rays radiated from the transmitter and enters the successive flipflop, turning on a flipflop FF. On the other hand, an output of a reference signal producing photoelectric element $D_2$ a reference signal, which if not great enough to serve for a successive signal treatment may be amplified by an amplifier $A_2$ if necessary. This reference signal enters the flipflop FF through a noise filter $F_2$ similar to $F_1$, turning off the flipflop.

As described above, there is a time difference according to the range of the object between signals generated by the photoelectric conversion elements $D_1$ and $D_{22}$, so that a pulse width of output for the flipflop is set in accordance with the range of object. This output is further smoothed by a low pass filter $LF_1$ and enters a differential amplifier DA. On the other hand, in a photographing optical system O there is provided a potentiometer and the like, not shown, and a time constant setting circuit T is formed to control the pulse width for a successive pulse generator $G_2$. Since the pulse generator $G_2$ is triggered by an output of the noise filter $F_1$, a pulse is generated at the moment when the reflected flux of radiant rays from the object is detected by the photoelectric conversion element $D_1$ and the pulse width is controlled by the time constant circuit T, and therefore the width of the output pulse of the pulse generator $G_2$ becomes a signal which represents the instantaneous positions in the photographing optical system. This signal is also smoothed by a low pass filter $LF_2$ and enters the differential amplifier DA. This differential amplifier DA, which receives two inputs as mentioned above, therefore, generates a signal according to the difference between the range required for the photographing optical system as its output and the actual range of the object and the direction of said difference. This signal is supplied to a servo-motor M to drive said motor M finally causing the photographing optical system to is moved till a focus be properly adjusted relative to the object, thus realizing an automatically adjustable focusing system using a range detecting device according to this invention. In the drawing, there is shown a mode in which a reference signal is directly supplied to the flipflop FF from the pulse generator $G_1$ instead of using an optical method, which is indicated by a broken line.

Figure 3:
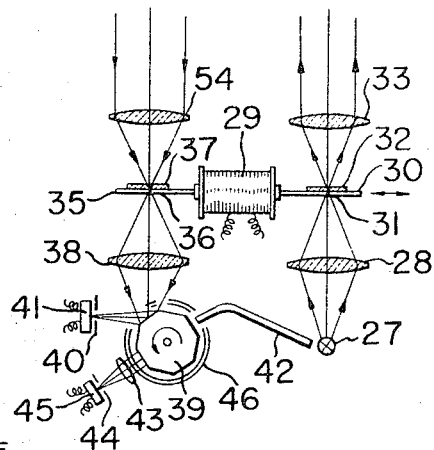
FIG. 3 is a view showing a second embodiment, different from that of FIG. 1.

FIG. 3 illustrates another embodiment of a range detection device according to the invention. There is shown a source of radiant rays as at 27, for making a range finding mark on the object and said source may comprise a solid light producing element such as a tungsten lamp or a light producing diode similar to the source 1 of radiant rays shown in FIG. 1. The radiant rays radiated from the source of radiant rays 27 form a conjugate image by way of an optical system 28. On the other hand, there is arranged an oscillating member 30, in the position of the conjugate image, connected with an oscillation device 29 such as a plunger which is adapted to be oscillated at a constant frequency, repeating its oscillation in a direction as indicated by the arrow. A small port 31 is made in part of the oscillating member and the conjugate image formed by the optical system 28 of the source of radiant rays 27, is further projected through said small port 31 as a parallel flux of radiant rays towards the object by way of an optical system 33. A filter 32, for limiting a wave length region to the desired radiant rays, is mounted in the portion of the small port 31 of the oscillating member 30, the flux of radiant rays which comes out of the optical system 33 has a wave length as required and is amplitude-modulated at a constant frequency. On the other hand, reflected flux of radiant rays from the object is converged by a light receiving optical system 34 arranged in a spaced relation of base line with the optical system 33. An oscillating member 35 which is oscillated by an oscillation device 29 is arranged corresponding to a converging point, and a small port 36 is made in said oscillating member 35. Further, said small port 36 is provided with a filter 37 having transmission similar to that of the filter 32. If an arrangement is so that the small port 36 made in the oscillating member 35 is fitted in a position where an image of the reflected radiant rays by the optical system 34 is formed at an instant when the small port 31 in the oscillating member 30 passes through the position of conjugate image, flux of the reflected radiant rays caught by the light receiving optical system, thereafter enters the optical detecting portion only when the radiant rays are projected on the object, to thereby obtain an extremely high ratio of signal to noise. However, in this instance, width of the small port 36 should be made relatively larger than the width of the small port 31 so as not to shield it even by movement of the image caused by the variation of the incident angle of flux of reflected radiant rays. Thus, incident flux of radiant rays is again formed by way of the optical system 38, and is intermittently projected on the photoelectric conversion element 41 through a slit 40 by means of a rotating prism 39 coupled to a motor 46 and rotated at constant speed. On the other hand, radiant rays radiated from the source of radiant rays 27 for generation of a reference signal are conducted to the rotating prism 39 by a glass fibre 42, and penetrate the prism only at the moment when two surfaces of the rotating prism occupy the particular positions as shown and are projected on the photoelectric conversion element 45 for forming a reference signal through the image forming optical system 43 and slit 44. Outputs of the photoelectric conversion elements 41 and 45 have a time difference corresponding to the range of the objects in accordance with the same principle as explained in the embodiment shown in FIG. 1 and, therefore, it is obvious that a signal treatment for realization of an automatically adjustable focusing system may be carried out similarly to that of FIG. 2 by two output signals as described above.

A rotating prism 34 suitable for use in the embodiment as shown in FIG. 6 is preferably formed as shown in FIG. 6 (b).

Figure 4:
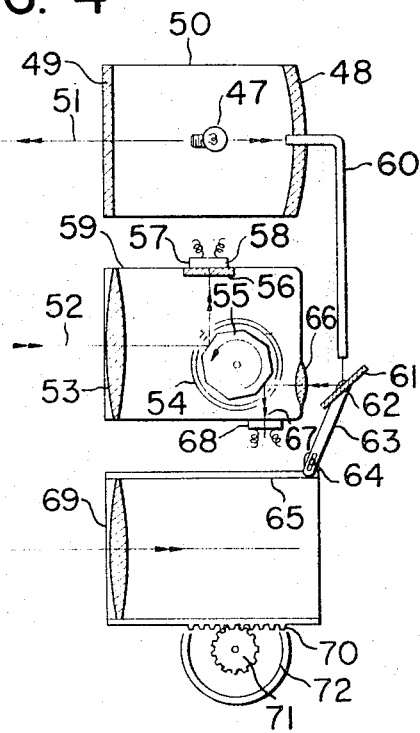
FIG. 4 is a view showing one embodiment of a mode in which the characteristic of a reference signal varies in response to the position of the photographing optical system.

FIG. 4 shows one embodiment of a mode, in which the characteristic of the reference signal varies with the position of the photographing optical system. In FIG. 4, parallel flux of radiant rays, projected from a reflector comprising a source of radiant rays 47, spherical mirror 48, filter 49, and mirror cylinder 50, is amplitude-modulated at a constant frequency and reaches the object along the optical axis 51. The flux of radiant rays reflected from the object enters a light receiving optical system comprising an optical system 53 in a spaced relation of base line with the optical axis 51, rotating prism 55 which is rotated at constant speed by means of motor 54, slit 57 and photoelectric conversion element 58 and is intermittently projected on the photoelectric conversion element 58. On the other hand, radiant rays conducted from the source of radiant rays by a light guide 60 are reflected by a reflection mirror 61 which rotates, corresponding to the position of the photographing optical system 69, around the stationary pin 62 by means of a lever 63 which engages through a pin 64 with one part of a mirror cylinder 65 which supports a photographing optical system 69, and is reflected through the optical system 66 mounted on a part of the mirror cylinder 59 which supports the light receiving system by means of the prism 55, and is then intermittently projected through the slit 67 on the photoelectric conversion element 68. The photographing optical system is moved by engagement of a rack 70 mounted on a part of the mirror cylinder 65 and a pinion 71 mounted on the servo-motor 72, when said motor 72 is rotated.

The operation of this device is as follows: the flux of radiant rays intermittently projected on the photoelectric conversion element 58 enters the light receiving system with an inclination corresponding to the range of the object. On the other hand, the flux of the radiant rays for the reference signal is reflected and deviated by a reflection mirror 61 having an angle corresponding to the position of the photographing optical system 69 so that if the relation between the position of the photographing optical system 69 and the position of the angle of rotation of the reflection mirror 61 is predetermined in such a manner that when the focus of the object is properly adjusted by the photographing optical system, the difference between the photoelectric conversion element 58 and the incident time when the flux of radiant rays entering 68 comes to zero, the focus in the photographing optical system is automatically adjusted.

Figure 5:
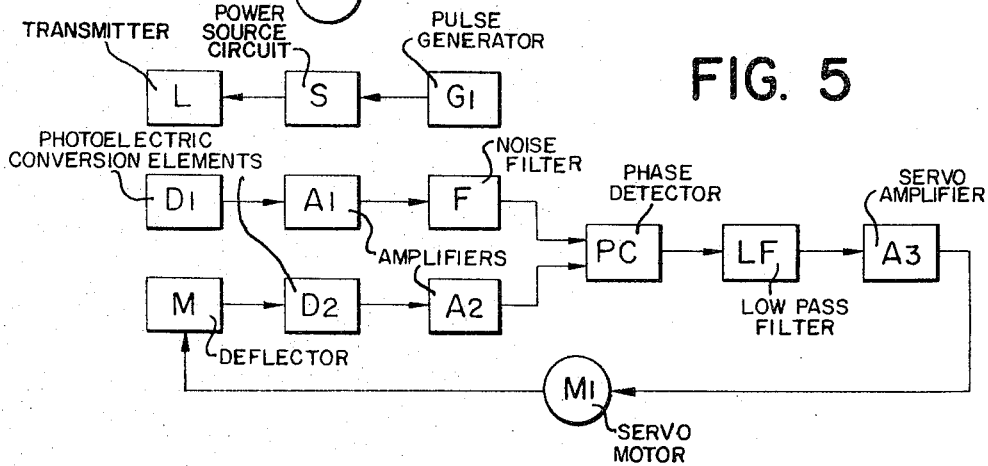
FIG. 5 is an electrical block diagram of the device shown in FIG. 4.

FIG. 5 is a block diagram of an electric circuit suitable for use in the device as shown in FIG. 4. There is shown a pulse generator as at $G_1$, which generates pulses at a constant frequency, and radiant rays are radiated from a transmitter L through a power source circuit S. The flux of reflected radiant rays from the object is detected by a photoelectric conversion element $D_1$. This is only an extremely feeble output and, therefore, it is amplified by an amplifier $A_1$ and then enters a noise filter F which removes various noises. An output of the noise filter F enters a phase detector P.C. On the other hand, an output of the flux of radiant rays which is projected through a deflector M for deflecting the flux of radiant rays for the reference signal associated with the photographing optical system to the photoelectric conversion element $D_2$, is amplified by an amplifier $A_2$ and conducted to the phase detector P.C. After the two signals have been compared, in phase, by means of the phase detecter, the two signals are converted into an output corresponding to the phase difference and the direction of displacement of the two signals, and is smoothed by a low pass filter LF and amplified by a servo amplifier $A_3$ before entering the servo-motor. Since the photographing optical system and the deflecter M are driven till the servo-motor is rotated to a position wherein the phases of the two signals coincide, the photographing optical system is properly adjusted in focus with respect to the object at all times.

Figure 7:
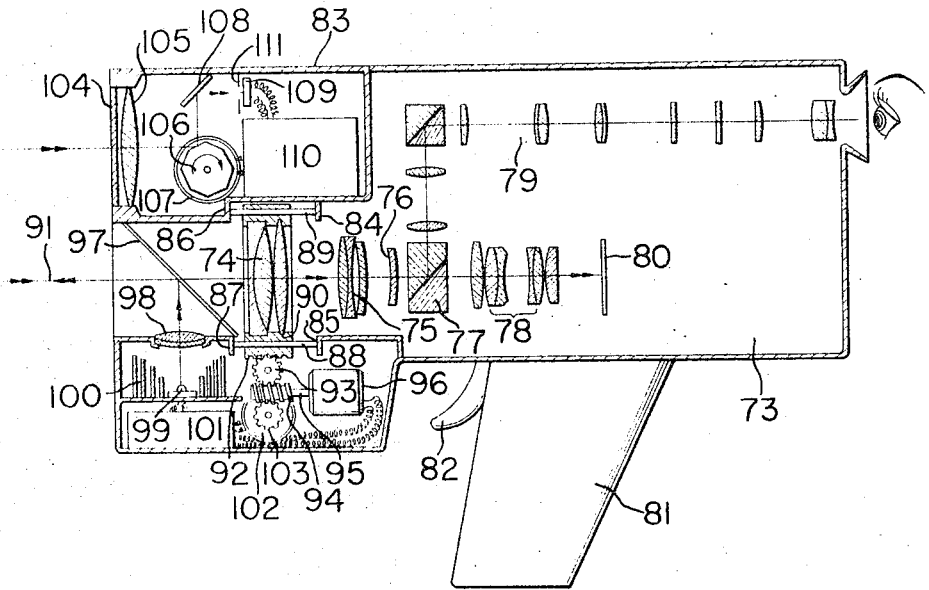
FIG. 7 shows an embodied mode in which the automatically adjustable focusing system according to this inventin is built in a camera.

FIG. 7 is a view showing a mode in which an automatically adjustable focusing system according to this invention is built in a camera. A camera body is designated at 73 comprising an optical system of a conventional construction, a grip 81, and a release button 82. The optical system of said camera comprises a group of lenses including a focus adjusting lens 74, a magnification varying lens 75, a compensating lens 76, a halfprism 77 which divides and reflects incident light flux into a finder optical system, a relay lens 78, and a finder optical system 79. A film is designated at 80. The focus adjusting lens 74 is held by a slidable mirror cylinder 90 along the shafts 88 and 89 carried in bearings 84, 85, 86, and 87, formed in a part of a case 83 and is so constructed as to be movable towards an optical axis 91. Fixed on a part of the outer cylindrical surface of said mirror cylinder 90 is a rack 92 which is meshed with a pinion and a worm gear 94, and said mirror cylinder 90 is adapted to be movable in the direction of the axis in accordance with the of a servo-motor 96 in forward and reverse directions through a shaft 95 of the servo-motor 96 rotatable in forward and reverse directions. A translucent mirror 97 is fixed in front of said focus adjusting lens 74 with an inclination of 45° with respect to the optical axis of said lens. This translucent mirror 97 is so designed as to have its penetration reflecting characteristic such that the penetration ability of a visible light is high and the reflection factor is high near the infrared ray region. A luminescent diode 99, such as one having its luminescent wave length near the infrared region, is disposed in the focus position of lens 98. Therefore, the flux light of near the infrared ray region generated in the luminescent diode 99 is made into a parallel flux of light at the lens 98 and is reflected at the surface of said translucent mirror 97 to deflect its travelling direction by 90° to project on the object. It is needless to say that the flux of light thus projected is properly modulated so as to be discriminated from disturbing light outside. A radiation plate 100 for the luminescent diode 99 is shown. Thus, the flux of light projected on the object is formed as if it was projected from the center of the photographing optical system. Therefore, with a camera provided with a through the lens finder system as described above, the photographer can accurately make a spot by a projection light by aiming a range finding field mark indicated in the center of finder at the object to be photographed. In view of the above, the so-called active type automatically adjustable focusing apparatus, for example, according to this invention, has a remarkable feature such that a projection light in the photographing optical system is focus-adjusted relative to an object irradiated so as to completely prevent a range finding error based on parallax due to the fact that the reflecting optical system and the photographing optical system do not co-own their optical axes.

Flux of light reflected by the object is also discriminated by an outer filter 104 from a visible light outside, and passes through a light receiving lens 105, being reflected by a rotating prism 106 to deflect its direction by about 90°, and again being reflected by a total reflection mirror 108 and then enters a light receiving element 109. A slit is indicated at 111. The rotating prism 106 is constructed as shown in FIG. 6 (a) and directly connected with a motor 107 and rotates at a constant rate in a direction as indicated by the arrow. As above-described in detail referring to FIG. 1, the flux of light is intermittently irradiated on the light receiving element 109 in the timed relation with respect to the range of the object, and a producing time difference over a reference signal produced from the reference signal producing means (21a, 21b, 22a, and 22b in FIG. 6 (a) provided on a part of the rotating prism is converted into a pulse corresponding to the range of the object within a control circuit 110. This control circuit 110 has substantially the same construction and function as another control circuit 101 having a function associated with the driving of the servo-motor 96 for principally driving the luminescent diode 99 and the one replaced by the pulse output from the reference signal producing means having the light receiving element $D_2$ for the reference signal mounted on the said rotating prism 106. On the other hand, the rotation of the servo-motor 96 is transmitted to a potentiometer 102 through a worm gear 94 and a worm wheel 103, and the electric output thereof enters the control circuit in the form of a signal in the position of the lens for adjusting the focus.

As described above, if a camera provided with an automatically adjustable focusing apparatus as shown is directed on the object to be photographed, a focus adjusting lens is automatically adjusted with respect to the object to be photographed by the operation as abovedescribed in detail, referring to FIGS. 1, 2, and 3, through said transmission of the light flux and the treatment of the electric signals.

As described in the foregoing, the system of the invention easily provides an automatically adjustable range-finder in a precise camera, TV camera and the like by way of a simple range detection and also a combination of a range detector and a photographing optical system in a suitable manner. Further, the actual automatically adjustable focusing system involves many difficulties, that is, it is hard to treat a signal due to an extremely feeble input in the system. According to this invention, however, the input in the system employs a pulse signal having a high ratio of signal to noise in its inherent nature, thereby offering possibilities of overcoming previous difficulties.

We claim:

1. A focusing system having an adjustable objective, said focusing system comprising: a radiating source for radiating a radiant ray amplitude-modulated at a constant frequency on an object; a first photoelectric conversion means which receives a radiant ray reflected from said object of the ray radiated from said radiating source towards the object; a second photoelectric conversion means which receives a radiant ray directly obtainable from said radiating source; a light receiving means arranged in a constant spaced relation of base line with said radiating source, said light receiving means having [an intermittently radiating] means which receives a radiant ray reflected from said object of the ray radiated from said radiating source towards the object to intermittently project flux of radiant rays on said first photoelectric conversion means and to intermittently project flux of radiant rays directly obtainable from said radiating source on said second photoelectric conversion means; optical means arranged frontwardly of said light receiving means and adapted to direct the reflected ray from the object into said light receiving means; and a range detecting means for receiving the same radiant rays radiated from said radiating source into said first and second photoelectric conversion means and for detecting the range of object by comparing a time difference of signals obtainable at said first and second photoelectric conversion means.

2. A system as defined in claim 1, wherein said radiating source comprises a radiating means for flux of parallel radiant rays for radiating parallel radiant rays on the object.

3. A system as defined in claim 2, wherein said radiating means for flux of parallel radiant rays comprises a spherical mirror arranged opposite to the object bordering on said radiating source.

4. A system as defined in claim 2, wherein said radiating means for flux of parallel radiant rays comprises an image forming optical system arranged between said radiating source and the object.

5. A system as defined in claim 1, wherein said radiating source is amplitude-modulated at a constant frequency by means of an oscillating member arranged between said radiating source and the object.

6. A system as defined in claim 1, wherein said light receiving means comprises a rotatable orthooctagonal prism.

7. A system as defined in claim 6, wherein when an angle of substantially 45° is formed between said prism surface and the radiant rays reflected from the object from the radiant rays radiated by said radiating source towards the object, said prism intermittently projects said reflected rays on said first photoelectric conversion means and intermittently projects direct radiant rays from said radiating source on said second photoelectric conversion means.

8. A focusing system for photographic cameras and the like having an adjustable objective, said focusing system comprising: an image formation optical system for forming an image of an object on an image receiving surface; a radiating source for radiating a radiant ray amplitude-modulated at a constant frequency on an object; a first photoelectric conversion means which receives a radiant ray reflected from said object of the ray radiated from said radiating source towards the object; a second photoelectric conversion means which receives a radiant ray directly obtainable from said radiating source; a light receiving means arranged in a constant spaced relation of base line with said radiating source, said light receiving means having [an intermittently radiating] means which receives a radiant ray reflected from said object of the ray radiated from said radiating source towards the object to imtermittently project flux of radiant rays on said first photoelectric conversion means and to intermittently project flux of radiant rays directly obtainable from said radiating source on said second photoelectric conversion means; optical means arranged frontwardly of said light receiving means and adapted to direct the reflected ray from the object into said light receiving means; and a range detecting means for receiving the same radiant rays radiated from said source into said first and second photoelectric conversion means and for detecting the range of object by comparing a time difference of signals obtainable at said first and second photoelectric conversion means.

9. A system as defined in claim 8, wherein said radiating source comprises a radiating means for flux of parallel radiant rays for radiating parallel radiant rays on the object.

10. A system as defined in claim 9, wherein said radiating means for flux of parallel radiant rays comprises a spherical mirror arranged opposite to the object bordering on said radiating source.

11. A system as defined in claim 9, wherein said radiating means for flux of parallel radiant rays comprises an image forming optical system arranged between said radiating source and the object.

12. A system as defined in claim 8, wherein said radiating source is amplitude-modulated at a constant frequency by means of an oscillating member arranged between said radiating source and the object.

13. A system as defined in claim 8, wherein said light receiving means comprises a rotatable orthooctagonal prism.

14. A system as defined in claim 13, wherein when an angle of substantially 45° is formed between said prism surface and the radiant rays reflected from the object from the radiant rays radiated by said radiating source towards the object, said prims intermittently projects said reflected rays on said first photoelectric conversion means and intermittently projects direct radiant rays from said radiating source on said second photoelectric conversion means.

* * * * *

UNITED STATES PATENT OFFICE
CERTIFICATE OF CORRECTION

Patent No. 3,856,399                    Dated  December 24, 1974

Inventor(s)  KAZUYA HOSOE, ET AL.

It is certified that error appears in the above-identified patent and that said Letters Patent are hereby corrected as shown below:

Title Page, in the Abstract, lines 5 and 6, "from the radiant rays" should read --of the radiant rays--;

Column 1, line 33, "amovement" should read --a movement--;

Column 1, line 34, "variation" should read --a variation--;

Column 2, line 5, "phtoelectric" should read --photoelectric--;

Column 2, line 26, "inventin" should read --invention--;

Column 3, line 7, "formed" should read --forming--;

Column 3, line 15, "suitabley" should read --suitably--;

Column 3, line 22, "photoeelectric" should read --photoelectric--

Column 3, lines 44 and 45, "it be-comes is possible to find the range" should read --it is possible to find the range--;

Column 3, line 50, "is not optically is generated but generated" should read --is not optically generated but is generated--;

Column 3, line 57, "extended to position" should read --extended to a position--;

Column 4, line 10, "is radiated from a transmitter" should read --is radiated from a transmitter L--;

UNITED STATES PATENT OFFICE
CERTIFICATE OF CORRECTION

Patent No. 3,856,399      Dated December 24, 1974

Inventor(s) KAZUYA HOSOE, ET AL.

It is certified that error appears in the above-identified patent and that said Letters Patent are hereby corrected as shown below:

Column 4, line 18, "transmitter" should read --transmitter L--;

Column 4, line 21, "$D_2$ a reference signal" should read --$D_2$ is a reference signal--;

Column 4, line 29, "$D_{22}$" should read --$D_2$--;

Column 4, line 30, "the range of object" should read --the range of the object--;

Column 4, lines 53 and 54, "optical system to is moved till a focus be properly adjusted" should read --optical system to be moved until a focus is properly adjusted--;

Column 5, line 16, "the flux" should read --and the flux--;

Column 5, lines 29 and 30, "If an arrangement is so that the small port 36 made in the oscillating member 35" should read --If an arrangement is made so that the small port 36 in the oscillating member 35--;

Column 5, lines 43 and 44, "Thus, incident flux" should read --Thus, an incident flux--;

Column 5, line 59, "the objects" should read --the object--;

Column 7, line 1, "detecter" should read --detector--;

Column 7, line 29, "the axis" should read --the optical axis--;

Column 7, line 30, "with the of" should read --with the rotation of--;

UNITED STATES PATENT OFFICE
CERTIFICATE OF CORRECTION

Patent No. 3,856,399      Dated December 24, 1974

Inventor(s) KAZUYA HOSOE, ET AL.

It is certified that error appears in the above-identified patent and that said Letters Patent are hereby corrected as shown below:

Column 7, line 43, "Therefore, the flux light of near the" should read --Therefore, the flux of light near the--;

Column 8, lines 16 and 17, "Figure 6(a) should read --Figure 6(a))--;

Column 8, line 66, Claim 1, "means having [an intermittently radiating] should read --means having means--;

Column 9, line 38, Claim 7, "from the radiant rays radiated by said radiating source" should read --of the radiant rays radiated from said radiating source--;

Column 10, lines 6 and 7, Claim 8, "having [an intermit-tently radiating] means" should read --having means--;

Column 10, line 45, Claim 14, "from the radiant rays radiated by said" should read --of the radiant rays radiated from said--;

Column 10, line 46, Claim 14, "prims" should read --prisms--;

Signed and sealed this 13th day of May 1975.

(SEAL)
Attest:

RUTH C. MASON
Attesting Officer

C. MARSHALL DANN
Commissioner of Patents
and Trademarks